US011971736B2

(12) United States Patent
O'Toole et al.

(10) Patent No.: US 11,971,736 B2
(45) Date of Patent: Apr. 30, 2024

(54) CURRENT MIRROR CIRCUITS

(71) Applicant: SanDisk Technologies LLC, Addison, TX (US)

(72) Inventors: James O'Toole, Boise, ID (US); Ward Parkinson, Boise, ID (US); Thomas Trent, Tucson, AZ (US)

(73) Assignee: SanDisk Technologies LLC, Austin, TX (US)

( * ) Notice: Subject to any disclaimer, the term of this patent is extended or adjusted under 35 U.S.C. 154(b) by 157 days.

(21) Appl. No.: 17/672,961

(22) Filed: Feb. 16, 2022

(65) Prior Publication Data

US 2023/0259149 A1 Aug. 17, 2023

(51) Int. Cl.
*G05F 3/00* (2006.01)
*G05F 3/26* (2006.01)

(52) U.S. Cl.
CPC .................................... *G05F 3/26* (2013.01)

(58) Field of Classification Search
CPC . G05F 3/262; G05F 3/26; G05F 3/242; G05F 1/575; G05F 3/245; G05F 1/561; G05F 3/247; G05F 1/465; G05F 3/267; G05F 1/468; G05F 3/205; G05F 1/463; G05F 1/56; G05F 3/16; G05F 3/20; G05F 3/30; H10K 59/12; H10K 59/351; H10K 50/844; H10K 50/846; H10K 50/85; H10K 50/86; H10K 50/87; H10K 59/131; H10K 59/353; H10K 59/88; H10K 19/00; H10K 59/1201
USPC ...................... 365/185.21, 205, 154, 230.03
See application file for complete search history.

(56) References Cited

U.S. PATENT DOCUMENTS

| | | | |
|---|---|---|---|
| 7,286,417 B2 | 10/2007 | Pan | |
| 7,315,475 B2 | 1/2008 | Honda | |
| 7,826,284 B2 | 11/2010 | La Placa et al. | |
| 8,169,834 B2 | 5/2012 | Wang et al. | |
| 10,614,893 B2 | 4/2020 | Miyazaki | |
| 2009/0121699 A1 | 5/2009 | Park et al. | |
| 2011/0121367 A1 * | 5/2011 | Yoshimura .......... | H01L 27/0207 257/E27.046 |
| 2020/0050232 A1 | 2/2020 | Wadhwa et al. | |

FOREIGN PATENT DOCUMENTS

| | | |
|---|---|---|
| CN | 112071344 A | 12/2020 |
| JP | 3926051 B2 | 6/2007 |
| TW | I298886 B | 7/2008 |

* cited by examiner

*Primary Examiner* — Thong Q Le
(74) *Attorney, Agent, or Firm* — Vierra Magen Marcus LLP

(57) ABSTRACT

A circuit is provided that includes a first transistor having a first terminal, a second terminal and a third terminal, and a second transistor comprising a first terminal, a second terminal and a third terminal. The first terminal of the first transistor comprises an input terminal of the circuit, the second terminal of the first transistor is coupled to a power supply bus, and the first transistor conducts a first current. The first terminal of the first transistor comprises an output terminal of the circuit, the second terminal of the second transistor is coupled to the power supply bus, and the third terminal of the second transistor is coupled to the third terminal of the first transistor. The second transistor conducts a second current proportional to the first current substantially independent of distance between the first transistor and the second transistor.

20 Claims, 7 Drawing Sheets

CURRENT MIRROR CIRCUITS

BACKGROUND

Current mirror circuits are frequently used in semiconductor integrated circuits, such as semiconductor memory. Current mirror circuits are widely used in semiconductor integrated circuits to replicate a reference current for use in various circuits. A common use is to provide bias currents for op amps. A current mirror circuit typically includes a first transistor (sometimes referred to as a "driver device") that conducts a known reference current and generates a bias voltage that is applied to a second transistor (sometimes referred to as a "mirror device") that conducts a "mirror current." The generated mirror current can be made proportional to the reference current by adjusting the ratio of the size of the driver device to the size of the mirror device.

In some instances, a distance between the driver device and the mirror device may be significant. If the driver device and the mirror device share a common power supply bus, parasitic resistance in the power supply bus may result in errors in the generated mirror current.

BRIEF DESCRIPTION OF THE DRAWINGS

Like-numbered elements refer to common components in the different figures.

DETAILED DESCRIPTION

Technology is described for current mirror circuits that may be used to generate mirror currents in semiconductor integrated circuits, such as semiconductor memory.

Semiconductor memory may include non-volatile memory or volatile memory. A non-volatile memory allows information to be stored and retained even when the non-volatile memory is not connected to a source of power (e.g., a battery). Examples of non-volatile memory include flash memory (e.g., NAND-type and NOR-type flash memory).

In semiconductor memory, current mirror circuits are often used to generate currents to read and write a selected memory cell. Semiconductor memory often includes a memory array that is divided into sub-arrays, some memory chips having thousands of sub-arrays, each with its own read and write circuitry and current mirror devices.

In many implementations, a reference current generator and current mirror driver device are located outside the memory array. The driver device generates a bias voltage that is distributed to mirror devices in each of the memory sub-arrays. This results in a large and variable distance between the driver device and the numerous mirror devices. If the driver device and the mirror devices share a common power supply bus, voltage differences along the power supply bus due to parasitic resistance in the power supply bus may result in errors in the generated mirror currents.

As a result, currents generated by the mirror devices in the various memory sub-arrays may have unacceptably large errors from desired current values. Technology is described to provide current mirror circuits that generate mirror currents that are proportional to a reference current substantially independent of voltage differences along the power supply bus between the driver device and the mirror device. In addition, the described current mirror circuits generate mirror currents that are proportional to a reference current substantially independent of distance between the driver device and the mirror device.

Figure 1:
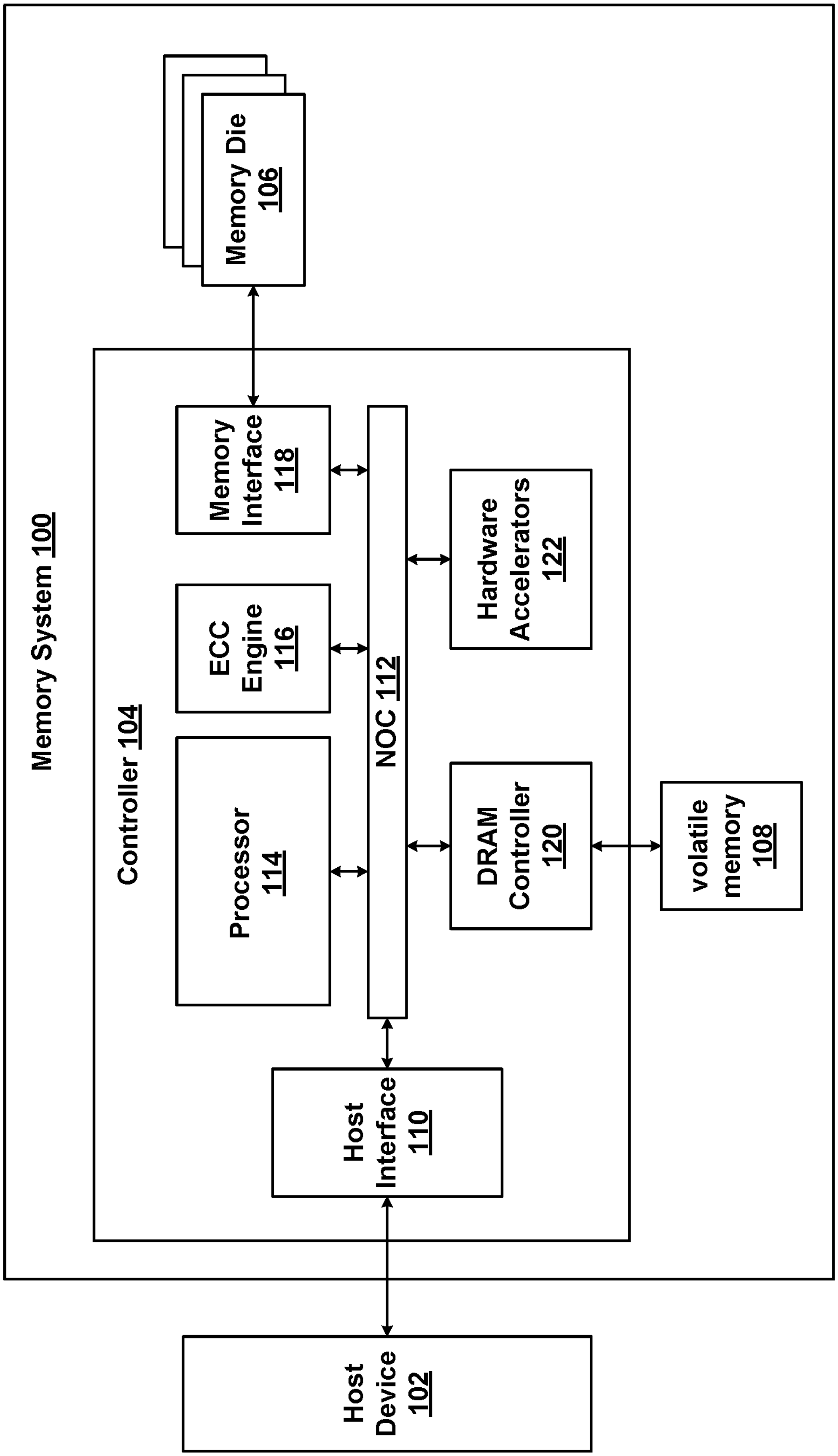
FIG. 1 is a block diagram depicting one embodiment of a memory system.

FIG. 1 is a block diagram of an embodiment of a memory system 100 that implements the described technology. In an embodiment, memory system 100 is an SSD. Memory system 100 also can be a memory card, USB drive or other type of storage system. The proposed technology is not limited to any one type of memory system. Memory system 100 is connected to host 102, which can be a computer, server, electronic device (e.g., smart phone, tablet or other mobile device), appliance, or another apparatus that uses memory and has data processing capabilities. In some embodiments, host 102 is separate from, but connected to, memory system 100. In other embodiments, memory system 100 is embedded within host 102.

The components of memory system 100 depicted in FIG. 1 are electrical circuits. Memory system 100 includes a controller 104 connected to one or more memory die 106 and local high speed volatile memory 108 (e.g., DRAM). The one or more memory die 106 each include a plurality of non-volatile memory cells. More information about the structure of each memory die 106 is provided below. Local high speed volatile memory 108 is used by controller 104 to perform certain functions.

Controller 104 includes a host interface 110 that is connected to and in communication with host 102. In one embodiment, host interface 110 provides a PCIe interface. Other interfaces can also be used, such as SCSI, SATA, etc. Host interface 110 is also connected to a network-on-chip (NOC) 112, which is a communication subsystem on an integrated circuit. In other embodiments, NOC 112 can be replaced by a bus. A processor 114, an ECC engine 116, a memory interface 118, a DRAM controller 120 and hardware accelerators 122 are connected to and in communication with NOC 112.

Processor 114 performs the various controller memory operations, such as programming, erasing, reading, as well as memory management processes. In an embodiment, processor 114 is programmed by firmware. In other embodiments, processor 114 is a custom and dedicated hardware circuit without any software. In an embodiment, processor 114 also implements a translation module, as a software/firmware process or as a dedicated hardware circuit.

In an embodiment, ECC engine 116 performs error correction. For example, ECC engine 116 performs data encoding and decoding, as per the implemented ECC technique. In one embodiment, ECC engine 116 is an electrical circuit programmed by software. For example, ECC engine 116 can be a processor that can be programmed. In other embodiments, ECC engine 116 is a custom and dedicated hardware circuit without any software. In another embodiment, the function of ECC engine 116 is implemented by processor 114.

In an embodiment, memory interface 118 communicates with one or more memory die 106. In an embodiment, memory interface 118 provides a Toggle Mode interface. Other interfaces also can be used. In some example implementations, memory interface 118 (or another portion of controller 104) implements a scheduler and buffer for transmitting data to and receiving data from one or more memory die.

In an embodiment, DRAM controller 120 is used to operate and communicate with local high speed volatile memory 108 (e.g., DRAM). In other embodiments, local high speed volatile memory 108 can be SRAM or another type of volatile memory.

Figure 2:
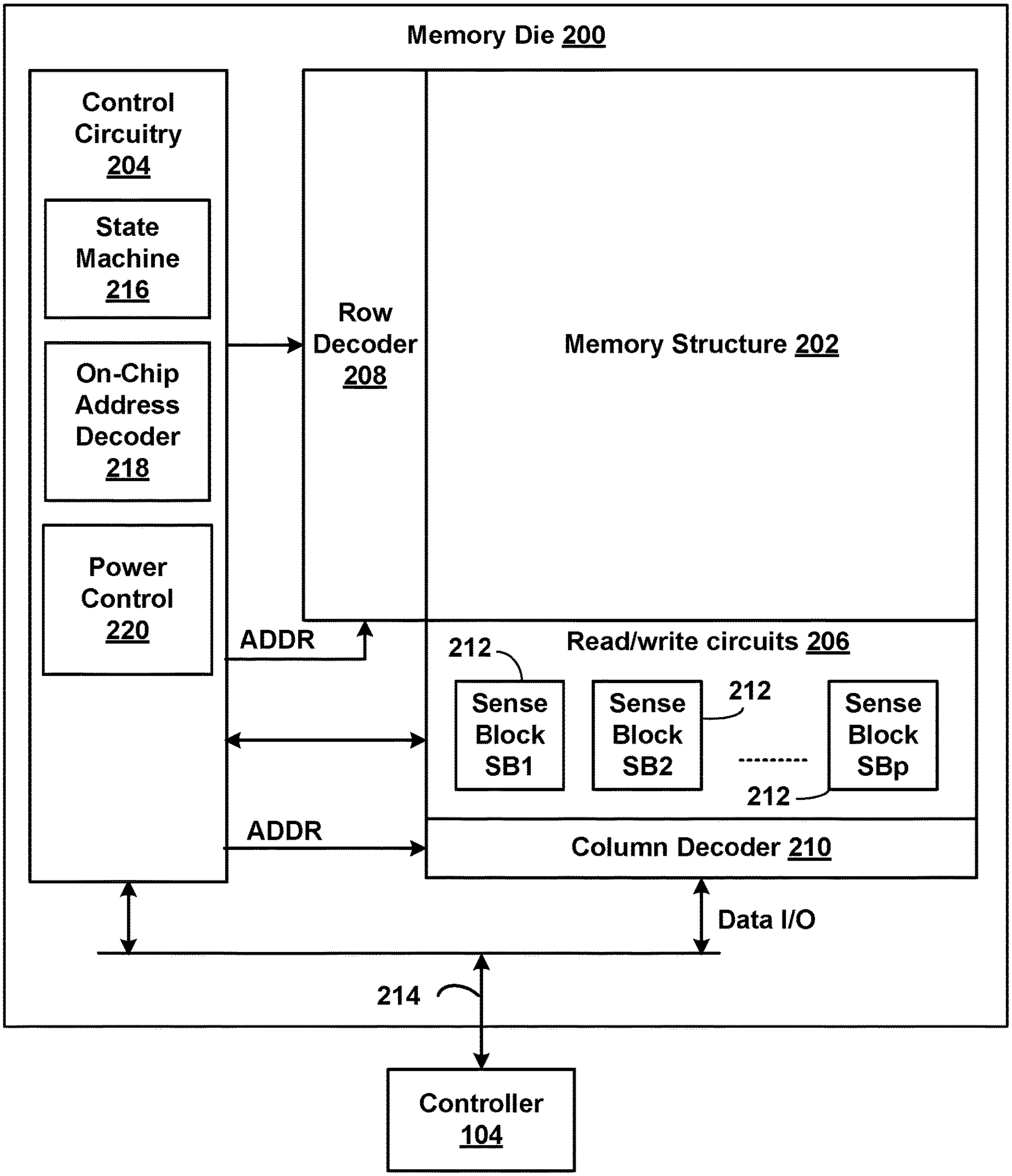
FIG. 2 is a block diagram of one embodiment of a memory die.

FIG. 2 is a functional block diagram of one embodiment of a memory die 200. Each of the one or more memory die 106 of FIG. 1 can be implemented as memory die 200 of FIG. 2. The components depicted in FIG. 2 are electrical circuits. In an embodiment, each memory die 200 includes a memory structure 202, control circuitry 204, and read/write circuits 206. Memory structure 202 is addressable by word lines via a row decoder 208 and by bit lines via a column decoder 210.

In an embodiment, read/write circuits 206 include multiple sense blocks 212 including SB1, SB2, . . . , SBp (sensing circuitry) and allow a page (or multiple pages) of data in multiple memory cells to be read or programmed (written) in parallel. In an embodiment, each sense block 212 includes a sense amplifier and a set of latches connected to the bit line. The latches store data to be written and/or data that has been read. In an embodiment, the sense amplifier of each sense block 212 includes bit line drivers. In an embodiment, commands and data are transferred between controller 104 and memory die 200 via lines 214. In an embodiment, memory die 200 includes a set of input and/or output (I/O) pins that connect to lines 214.

In an embodiment, control circuitry 204 cooperates with read/write circuits 206 to perform memory operations (e.g., write, read, erase, and others) on memory structure 202. In an embodiment, control circuitry 204 includes a state machine 216, an on-chip address decoder 218, and a power control module 220.

In an embodiment, state machine 216 provides die-level control of memory operations. In an embodiment, state machine 216 is programmable by software. In other embodiments, state machine 216 does not use software and is completely implemented in hardware (e.g., electrical circuits). In some embodiments, state machine 216 can be replaced by a microcontroller or microprocessor. In an embodiment, control circuitry 204 includes buffers such as registers, ROM fuses and other storage devices for storing default values such as base voltages and other parameters.

On-chip address decoder 218 provides an address interface between addresses used by controller 104 to the hardware address used by row decoder 208 and column decoder 210. Power control module 220 controls the power and voltages supplied to the word lines and bit lines during memory operations. Power control module 220 may include charge pumps for creating voltages.

Power control module 220 also may include current mirror driver circuits for creating current mirror bias voltages provided to other circuitry on memory die 200. For example, power control module 220 may include current mirror driver circuits that provide current mirror bias voltages to current mirror devices in one or more of memory structure 202, control circuitry 204, read/write circuits 206, row decoder 208, column decoder 210, sense blocks 212, and/or other circuits on memory die 200.

For purposes of this document, control circuitry 204, read/write circuits 206, row decoder 208 and column decoder 210 comprise a control circuit for memory structure 202. In other embodiments, other circuits that support and operate on memory structure 202 can be referred to as a control circuit. For example, in some embodiments, controller 104 can operate as the control circuit or can be part of the control circuit. The control circuit also can be implemented as a microprocessor or other type of processor that is hardwired or programmed to perform the functions described herein.

In an embodiment, memory structure 202 is a three dimensional memory array of non-volatile memory cells. In an embodiment, memory structure 202 is a monolithic three dimensional memory array in which multiple memory levels are formed above a single substrate, such as a wafer. Memory structure 202 may be any type of non-volatile memory that is formed in one or more physical levels of arrays of memory cells having an active area disposed above a silicon (or other type of) substrate. In one example, the non-volatile memory cells of memory structure 202 include vertical NAND strings with charge-trapping material such as described. A NAND string includes memory cells connected by a channel.

In another embodiment, memory structure 202 includes a two dimensional memory array of non-volatile memory cells. In an example, the non-volatile memory cells are NAND flash memory cells utilizing floating gates. Other types of memory cells (e.g., NOR-type flash memory) also can be used.

In still another embodiment, memory structure 202 includes a memory array (two dimensional or three dimensional) that includes multiple memory sub-arrays, with each memory sub-array including multiple non-volatile memory cells.

The exact type of memory array architecture or memory cell included in memory structure 202 is not limited to the examples above. Many different types of memory array architectures or memory cell technologies can be used to form memory structure 202. No particular non-volatile memory technology is required for purposes of the new technology described herein.

Other examples of suitable technologies for memory cells of the memory structure 202 include ReRAM memories, magnetoresistive memory (MRAM), phase change memory (PCM), and the like. Examples of suitable technologies for architectures of memory structure 202 include two dimensional arrays, three dimensional arrays, cross-point arrays, stacked two dimensional arrays, vertical bit line arrays, and the like.

One example of a cross point memory includes reversible resistance-switching elements arranged in cross point arrays accessed by X lines and Y lines (e.g., word lines and bit lines). In another embodiment, the memory cells may include conductive bridge memory elements. A conductive bridge memory element also may be referred to as a programmable metallization cell.

A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of solid electrolyte between the two electrodes.

MRAM stores data using magnetic storage elements. The magnetic storage elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—$Sb_2Te_3$ super lattice to achieve non-thermal phase changes by simply changing the coordination state of Germanium atoms with a laser pulse (or light pulse from another source). Therefore, the doses of programming are laser pulses. The memory cells can be inhibited from programming by blocking the memory cells from receiving the light.

A person of ordinary skill in the art will recognize that the technology described herein is not limited to a single specific memory structure, but covers many relevant memory structures within the scope of the technology as described herein and as understood by one of ordinary skill in the art.

Figure 3:
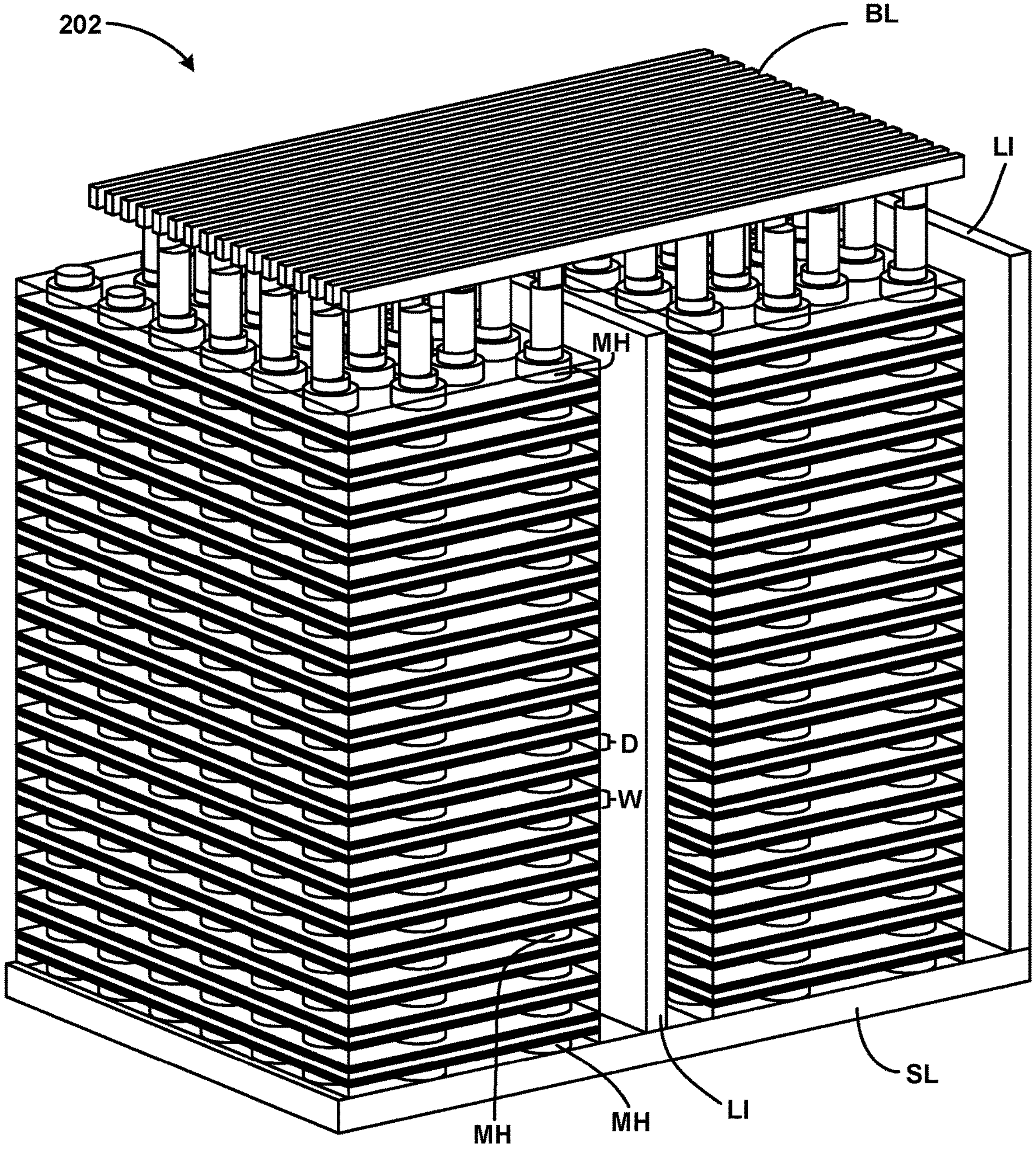
FIG. 3 is a perspective view of a portion of one embodiment of a three dimensional memory structure.

FIG. 3 is a perspective view of a portion of an embodiment of a three dimensional memory array that includes memory structure 202. In an embodiment, memory structure 202 includes multiple non-volatile memory cells. For example, FIG. 3 shows a portion of one block of memory cells. The structure depicted includes a set of bit lines BL positioned above a stack of alternating dielectric layers and conductive layers. For example purposes, one of the dielectric layers is marked as D and one of the conductive layers (also called word line layers) is marked as W.

The number of alternating dielectric layers and conductive layers can vary based on specific implementation requirements. One set of embodiments includes between 108-300 alternating dielectric layers and conductive layers. One example embodiment includes 96 data word line layers, 8 select layers, 6 dummy word line layers and 110 dielectric layers. More or less than 108-300 layers also can be used. In an embodiment, the alternating dielectric layers and conductive layers are divided into four regions by local interconnects LI. FIG. 3 shows two regions and two local interconnects LI.

A source line layer SL is below the alternating dielectric layers and word line layers. Memory holes are formed in the stack of alternating dielectric layers and conductive layers. For example, one of the memory holes is marked as MH. Note that in FIG. 3 the dielectric layers are depicted as see-through so that the reader can see the memory holes positioned in the stack of alternating dielectric layers and conductive layers.

In an embodiment, NAND strings are formed by filling the memory hole with materials including a charge-trapping material to create a vertical column of memory cells (also referred to as a memory column). In an embodiment, each memory cell can store one or more bits of data. In an embodiment, each memory hole MH is associated with and coupled to a corresponding one of bit lines BL. In an embodiment, each bit line BL is coupled to one or more memory holes MH.

Figure 4A:
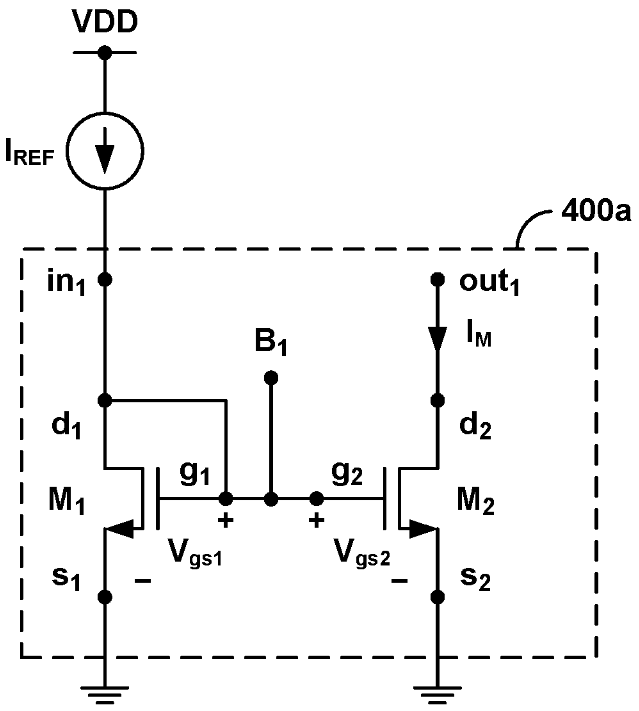
FIG. 4A (PRIOR ART)
FIG. 4A is a diagram of a conventional current mirror circuit.

FIG. 4A depicts a diagram of a conventional current mirror circuit 400*a*, which has an input terminal $in_1$, an output terminal $out_1$, a first transistor $M_1$ and a second transistor $M_2$. In the depicted example, first transistor $M_1$ and second transistor $M_2$ are each n-channel transistors. First transistor $M_1$ has a first (e.g., drain) terminal $d_1$, a second (e.g., source) terminal $s_1$ and a third (e.g., control or gate) terminal $g_1$. Second transistor $M_2$ has a first (e.g., drain) terminal $d_2$, a second (e.g., source) terminal $s_2$ and a third (e.g., control or gate) terminal D.

For convenience, first terminal $d_1$, second terminal $s_1$ and third terminal $g_1$ of first transistor $M_1$ will also be referred to herein as drain $d_1$, source $s_1$ and gate $g_1$, respectively, of first transistor $M_1$. Likewise, first terminal $d_2$, second terminal $s_2$ and third terminal $g_2$ of second transistor $M_2$ will also be referred to herein as drain $d_2$, source $s_2$ and gate $g_2$, respectively, of second transistor $M_2$.

Drain $d_1$ of first transistor $M_1$ is coupled to input terminal $in_1$, gate $g_1$ of first transistor $M_1$, and gate $g_2$ of second transistor $M_2$. Drain $d_2$ of second transistor $M_2$ is coupled to output terminal outs. Source $s_1$ of first transistor $M_1$ and source $s_2$ of second transistor $M_2$ are both coupled to a first power supply (e.g., GND). Input terminal $in_1$ receives an input reference current $I_{REF}$, depicted here as an ideal current source coupled to a second power supply (e.g., VDD). First transistor $M_1$, configured as shown in FIG. 4A with drain $d_1$ and gate $g_1$ coupled together, is commonly referred to as a diode-connected transistor.

In operation, reference current $I_{REF}$ flows through diode-connected first transistor $M_1$. Drain $d_1$ and gate $g_1$ of first transistor $M_1$ are at the same voltage $V_{gs1}$, the gate-to-source voltage $V_{gs1}$ of first transistor $M_1$. The conductor coupling gate $g_1$ of first transistor $M_1$ to gate $g_2$ of second transistor $M_2$ is labeled $B_1$ in FIG. 4A. No current flows through conductor $B_1$, and thus gate $g_2$ of second transistor $M_2$ also is at voltage $V_{gs1}$. As a result, a gate-to-source voltage $V_{gs2}$ of second transistor $M_2$ equals gate-to-source voltage $V_{gs1}$ of first transistor $M_1$:

$$V_{gs2}=V_{gs1} \tag{1}$$

If first transistor $M_1$ and second transistor $M_2$ are of equal size and have equal gate-to-source voltages, second transistor $M_2$ conducts an output current $I_M$ that equals (to a first order) reference current $I_{REF}$:

$$I_M=I_{REF} \tag{2}$$

In this regard, output current $I_M$ "mirrors" reference current $I_{REF}$, and also is referred to herein as mirror current $I_M$. Accordingly, first transistor $M_1$ is sometimes referred to a "driver device" and second transistor $M_2$ is sometimes referred to as a "mirror device," and those two terms also will be used in the remaining discussion.

By rationing the dimensions of mirror device $M_2$ relative to the dimensions of driver device $M_1$, output current $I_M$ may be made proportional to reference current $I_{REF}$. For example, if driver device $M_1$ has a width $W_1$ and a length L, and mirror device $M_2$ has a width $W_2$ and a same length L, output current $I_M$ may be expressed as follows:

$$I_M=\left(\frac{W_2}{W_1}\right)I_{REF} \tag{3}$$

For example, if $W_2=W_1$, $I_M=I_{REF}$. Alternatively, if $W_2=2W_1$, $I_M=2\ I_{REF}$, and so on.

To replicate mirrored currents $I_M$ to multiple circuits on an integrated circuit die, bus $B_1$ may be routed throughout the die to multiple instances of mirror device $M_2$, each having its gate $g_2$ coupled to bus $B_1$ and its source $s_2$ coupled to GND, and each scaled as desired to provide mirror currents that are proportional to reference current $I_{REF}$. Because substantially no current flows through bus $B_1$, the voltage on bus $B_1$ remains substantially constant at $V_{gs1}$ throughout the die.

If driver device $M_1$ and a particular mirror device $M_2$ are located in close proximity to one another, current mirror circuit 400*a* performs well and mirror current $I_M$ closely matches reference current $I_{REF}$. If driver device $M_1$ and a particular mirror device $M_2$ are not located in close proximity to one another, however, the ability to match currents may become degraded.

For example, driver device $M_1$ may be located in driver circuitry located in one portion of an integrated circuit die (e.g., a memory die), and a particular mirror device $M_2$ may be located relatively far away from driver device $M_1$ (e.g., in a memory sub-array relatively far from driver circuitry).

Figure 4B:
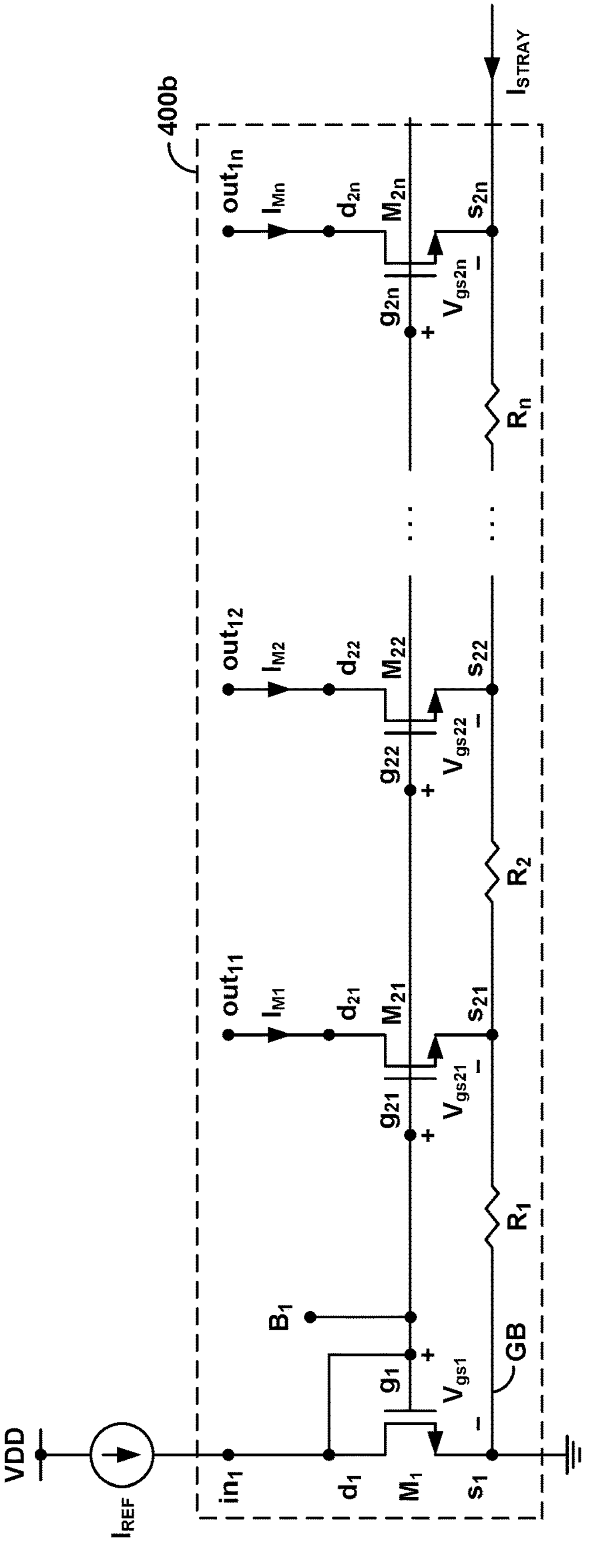
FIG. 4B (PRIOR ART)
FIG. 4B is a diagram of another conventional current mirror circuit.

FIG. 4B depicts such a scenario. In particular, FIG. 4B depicts a diagram of a current mirror circuit 400*b*, which is similar to current mirror circuit 400*a* of FIG. 4A. In this embodiment, however, driver device $M_1$ drives multiple mirror devices $M_{21}$, $M_{22}$, . . . , $M_{2n}$, all sharing a common power supply bus (e.g., ground bus GB). Each mirror device $M_{21}$, $M_{22}$, . . . , $M_2n$ has a corresponding source $s_{21}$, $s_{22}$, . . . , $s_{2n}$, respectively, coupled to ground bus GB, and a corresponding gate $g_{21}$, $g_{22}$, . . . , $g_{2n}$, respectively, coupled to bus $B_1$, and each provides a corresponding mirror current $I_{M1}$, $I_{M2}$, . . . , $I_{Mn}$, respectively.

In an embodiment, each mirror device $M_{21}$, $M_{22}$, . . . , $M_{2n}$ is located at a different distance from driver device $M_1$. For example, a memory die typically includes a large number of memory sub-arrays, each located a different distance from driver circuitry, and each memory sub-array includes a corresponding mirror device (e.g., a corresponding one of mirror devices $M_{21}$, $M_{22}$, . . . , $M_{2n}$).

In such an embodiment, some mirror devices (e.g., $M_{21}$) are located near driver device $M_1$, whereas other mirror devices (e.g., $M_{2n}$) are located relatively far from driver device $M_1$. As a consequence, resistance $R_1$, $R_2$, . . . , $R_n$ in ground bus GB between source $s_2$ of driver device $M_1$ and source $s_{21}$, $s_{22}$, . . . , $s_2n$ of each of mirror devices $M_{21}$, $M_{22}$, . . . , $M_{2n}$, respectively, may be significant, particularly for mirror devices (e.g., $M_{2n}$) located relatively large distances from driver device $M_1$.

As stated above, the voltage of bus $B_1$ remains substantially constant at $V_{gs1}$ through the die. As a result of ground bus GB resistance $R_1$, $R_2$, . . . , $R_n$, however, the gate-to-source voltage of driver device $M_1$ and each of mirror devices $M_{21}$, $M_{22}$, . . . , $M_{2n}$ are no longer equal. For example, $V_{gs2n}$ may be expressed as:

$$V_{gs2n}=V_{gs1}-(I_{STRAY}R_T+I_{M1}R_1I_{M2}(R_2+R_1)+ \ldots +I_{Mn}R_T) \qquad (4)$$

where $I_{Mn}$ is the mirror current of mirror device $M_{2n}$, $I_{STRAY}$ represents any unrelated currents flowing in ground bus GB, and $R_T$ is the total resistance in ground bus GB between source $s_1$ of driver device $M_1$ and source $s_2n$ of mirror device $M_{2n}$. For example, $R_T=R_1+R_2+ \ldots R_n$.

As a result, $V_{gs2n}$ is less than $V_{gs1}$, and in some instances the difference between $V_{gs2n}$ and $V_{gs1}$ may be on the order of about 100 mV-200 mV or more. Therefore mirror current $I_{Mn}$ does not match reference current $I_{REF}$:

$$I_{Mn}\neq I_{REF} \qquad (5)$$

Indeed, in some instances the resulting error in mirror current $I_{Mn}$ may be many tens of percent. This magnitude of error is unacceptable for may integrated circuit applications, such as in memory circuit applications.

In addition, because the total ground bus GB resistance $R_T$ between source $s_1$ of driver device $M_1$ and source $s_{21}$, $s_{22}$, . . . , $s_2n$ of corresponding mirror devices $M_{21}$, $M_{22}$, . . . , $M_{2n}$, respectively, will differ from one another, the purportedly "matched" mirror currents $I_{M1}$, $I_{M2}$, . . . , $I_{Mn}$ will vary from one another based on a distance between driver device $M_1$ and each of mirror devices $M_{21}$, $M_{22}$, . . . , $M_{2n}$, respectively, which is unacceptable in many instances, such as in memory circuit applications.

Figure 5A:
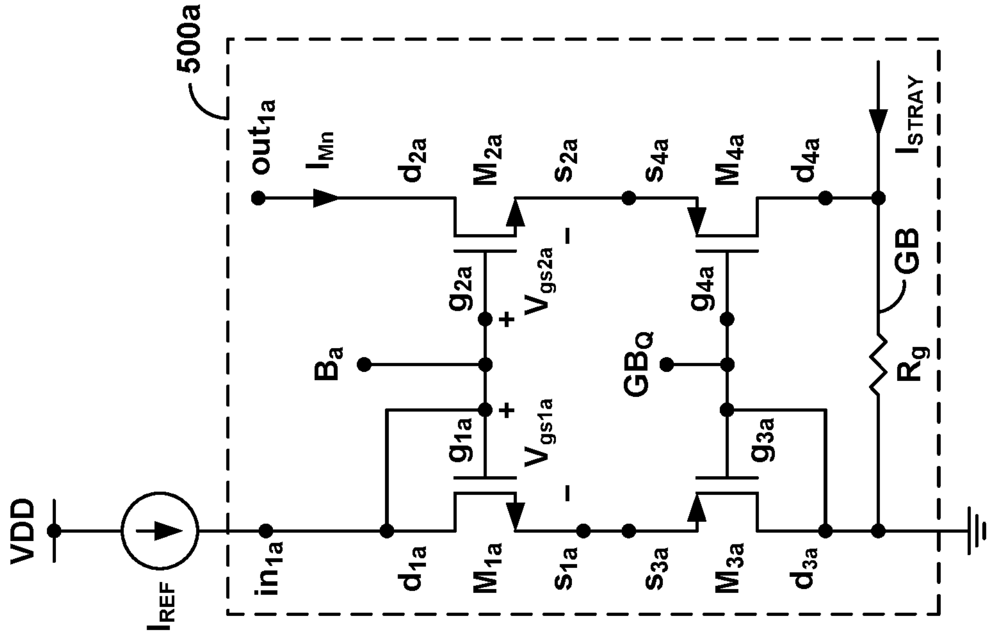
FIG. 5A is a diagram of an embodiment of a current mirror circuit.

Technology is described for current mirror circuits that may reduce the impact of power supply bus (e.g., GND, VDD, VSS or other similar power supply bus) resistance on current mirror output currents. FIG. 5A is an embodiment of a current mirror circuit 500*a*, which has an input terminal $in_{1a}$, an output terminal $out_{1a}$, a first transistor $M_{1a}$, a second transistor $M_{2a}$, a third transistor $M_{3a}$ and a fourth transistor $M_{4a}$. In the depicted example, first transistor $M_{1a}$ and second transistor $M_{2a}$ are each of a first polarity type (e.g., n-channel transistors), and third transistor $M_{3a}$ and fourth transistor $M_{4a}$ are each of a second polarity type different from the first polarity type (e.g., p-channel transistors).

First transistor $M_{1a}$ has a first (e.g., drain) terminal $d_{1a}$, a second (e.g., source) terminal $s_{1a}$ and a third (e.g., control or gate) terminal $g_{1a}$. Second transistor $M_{2a}$ has a first (e.g., drain) terminal $d_{2a}$, a second (e.g., source) terminal $s_{2a}$ and a third (e.g., control or gate) terminal $g_{2a}$. Third transistor $M_{3a}$ has a first (e.g., drain) terminal $d_{3a}$, a second (e.g., source) terminal $s_{3a}$ and a third (e.g., control or gate) terminal $g_{3a}$. Fourth transistor $M_{4a}$ has a first (e.g., drain) terminal $d_{4a}$, a second (e.g., source) terminal $s_{4a}$ and a third (e.g., control or gate) terminal $g_{4a}$.

For convenience, first terminal $d_{1a}$, second terminal $s_{1a}$ and third terminal $g_{1a}$ of first transistor $M_{1a}$ also will be referred to herein as drain $d_1$, source $s_{1a}$ and gate $g_{1a}$, respectively, of first transistor $M_{1a}$. Likewise, first terminal $d_{2a}$, second terminal $s_{2a}$ and third terminal $g_{2a}$ of second transistor $M_{2a}$ also will be referred to herein as drain $d_{2a}$, source $s_{2a}$ and gate $g_{2a}$, respectively, of second transistor $M_{2a}$. Similarly, first terminal $d_{3a}$, second terminal $s_{3a}$ and third terminal $g_{3a}$ of third transistor $M_{3a}$ also will be referred to herein as drain $d_{3a}$, source $s_{3a}$ and gate $g_{3a}$, respectively, of third transistor $M_{3a}$. Additionally, first terminal $d_{4a}$, second terminal $s_{4a}$ and third terminal $g_{4a}$ of fourth transistor $M_{4a}$ also will be referred to herein as drain $d_4$, source $s_4$ and gate $g_4$, respectively, of fourth transistor $M_4$.

Drain $d_{1a}$ of first transistor $M_{1a}$ is coupled to input terminal $in_{1a}$, gate $g_{1a}$ of first transistor $M_{1a}$, and gate $g_{2a}$ of second transistor $M_{2a}$. Drain $d_{2a}$ of second transistor $M_{2a}$ is coupled to output terminal $out_{1a}$. First transistor $M_{1a}$, configured as shown in FIG. 5A with drain $d_{1a}$ and gate $g_{1a}$ coupled together, is commonly referred to as a diode-connected transistor.

Drain $d_{3a}$ of third transistor $M_{3a}$ is coupled to a first power supply bus (e.g., ground bus GB), gate $g_{3a}$ of third transistor $M_{3a}$, and gate $g_{4a}$ of fourth transistor $M_{4a}$. Drain $d_{4a}$ of fourth transistor $M_{4a}$ is coupled to ground bus GB. Third transistor $M_{3a}$, configured as shown in FIG. 5A with drain $d_{3a}$ and gate $g_{3a}$ coupled together, is commonly referred to as a diode-connected transistor. Resistance in ground bus GB is represented as $R_g$. In an embodiment, drain $d_{3a}$ of third transistor $M_{3a}$ is coupled to a first location of ground bus GB, and drain $d_{4a}$ of fourth transistor $M_{4a}$ is coupled to second location different from the first location of ground bus GB.

Source $s_{1a}$ of first transistor $M_{1a}$ is coupled to source $s_{3a}$ of third transistor $M_{3a}$, and source $s_{2a}$ of second transistor $M_{2a}$ is coupled to source $s_{4a}$ of fourth transistor $M_{4a}$. Input terminal $in_{1a}$ receives input reference current IREF, depicted here as an ideal current source coupled to a second power supply (e.g., VDD).

In operation, reference current TREF flows through diode-connected first transistor $M_{1a}$ and diode-connected third transistor $M_{3a}$. Drain $d_{3a}$ and gate $g_{3a}$ of third transistor $M_{3a}$ are at the same voltage $V_{g3a}$. In the embodiment of FIG. 5A, drain $d_{3a}$ and gate $g_{3a}$ of third transistor $M_{3a}$ are coupled to ground bus GB, and thus voltage $V_{g3a}$ is at GND (e.g., $V_{g3a}$=0V).

The conductor coupling gate $g_{3a}$ of third transistor $M_{3a}$ to gate $g_{4a}$ of fourth transistor $M_{4a}$ is labeled $GB_Q$ in FIG. 5A. Conductor $GB_Q$ is also referred to herein as "quiet ground bus" $GB_Q$. No current flows through quiet ground bus $GB_Q$, and thus gate $g_{4a}$ of fourth transistor $M_{4a}$ is at a voltage $V_{g4a}$ that is substantially the same as voltage $V_{g3a}$ at gate $g_{3a}$ of third transistor $M_{3a}$. In the embodiment of FIG. 5A, voltage $V_{g4a}$ is at GND (e.g., $V_{g4a}$=0V).

Source $s_{3a}$ of third transistor $M_{3a}$ is at a voltage $V_{s3a}$ which may be expressed as:

$$V_{s3a}=V_{ON3}+|V_{tp}| \quad (6)$$

where $V_{ON3}$ is an on voltage of third transistor $M_{3a}$ and $V_{tp}$ is a threshold voltage of p-channel third transistor $M_{3a}$. Source $s_{1a}$ of first transistor $M_{1a}$ is at a voltage $V_{s1a}$ and is coupled to source $s_{3a}$ of third transistor $M_{3a}$. As a result, voltage $V_{s1a}$ equals voltage $V_{s3a}$:

$$V_{s1a}=V_{s3a} \quad (7)$$

As stated above, gate $g_{3a}$ of third transistor $M_{3a}$ and gate $g_{4a}$ of fourth transistor $M_{4a}$ are at substantially the same voltage $V_{g3a}$. Because the source voltage of a MOS transistor in saturation is a very weak function of the drain voltage, source $s_{4a}$ of fourth transistor $M_{4a}$ is at a voltage $V_{s4a}$ that is substantially the same as voltage $V_{s3a}$ at source $s_{3a}$ of third transistor $M_{3a}$:

$$V_{s4a}\approx V_{s3a} \quad (8)$$

Without wanting to be bound by any particular theory, it is believed that even a voltage difference of several hundred millivolts between drain $d_{4a}$ of fourth transistor $M_{4a}$ and drain $d_{3a}$ of third transistor $M_{3a}$ due to a voltage drop across ground bus GB resistance $R_g$ results in very little difference in source voltages $V_{s3a}$ and $V_{s4a}$, primarily due to third transistor $M_{3a}$ and fourth transistor $M_{4a}$ operating in the saturation region.

Source $s_{2a}$ of second transistor $M_{2a}$ is at a voltage $V_{s2a}$ and is coupled to source $s_{4a}$ of fourth transistor $M_{4a}$. As a result, voltage $V_{s2a}$ at source $s_{2a}$ of second transistor $M_{2a}$ equals voltage $V_{s4a}$ at source $s_{4a}$ of fourth transistor $M_{4a}$:

$$V_{s2a}=V_{s4a} \quad (9)$$

Thus, from Equations (7)-(9), source $s_{2a}$ of second transistor $M_{2a}$ and source $s_{1a}$ of first transistor $M_{1a}$ are at substantially the same voltage:

$$V_{s2a}\approx V_{s1a} \quad (10)$$

In an embodiment, the absolute value of a difference between $V_{s2a}$ and $V_{s1a}$ is less than about 5% despite voltage drops in ground bus GB between drain $d_{3a}$ of third transistor $M_{3a}$ and drain $d_{4a}$ of fourth transistor $M_{4a}$. In another embodiment, the absolute value of a difference between $V_{s2a}$ and $V_{s1a}$ is less than about 2% despite voltage drops in ground bus GB between drain $d_{3a}$ of third transistor $M_{3a}$ and drain $d_{4a}$ of fourth transistor $M_{4a}$. In still another embodiment, the absolute value of a difference between $V_{s2a}$ and $V_{s1a}$ is less than about 1% despite voltage drops in ground bus GB between drain $d_{3a}$ of third transistor $M_{3a}$ and drain $d_{4a}$ of fourth transistor $M_{4a}$.

Gate $g_{1a}$ of first transistor is at a voltage $V_{g1a}$, which may be expressed as:

$$V_{g1a}=V_{ON1}+V_{tn}+V_{s3a} \quad (11)$$

where $V_{ON1}$ is an on voltage of first transistor $M_{1a}$ and $V_{tn}$ is a threshold voltage of n-channel first transistor $M_{1a}$. Substituting Equation (6) into Equation (11), voltage $V_{g1a}$ may be expressed as:

$$V_{g1a}=V_{ON1}+V_{tn}+V_{ON3}+|V_{tp}| \quad (12)$$

The conductor coupling gate $g_{1a}$ of first transistor $M_{1a}$ to gate $g_{2a}$ of second transistor $M_{2a}$ is labeled $B_a$ in FIG. 5A. No current flows through conductor $B_a$, and thus gate $g_{2a}$ of second transistor $M_{2a}$ also is at voltage $V_{g1a}$. As a result, gate-to-source voltage $V_{gs1a}$ of first transistor $M_{1a}$ substantially equals gate-to-source voltage $V_{gs2a}$ of second transistor $M_{2a}$:

$$V_{gs1a}=V_{gs2a} \quad (13)$$

Accordingly, if first transistor $M_{1a}$ and second transistor $M_{2a}$ are of equal size, second transistor $M_{2a}$ conducts an output current $I_{Mn}$ that substantially equals reference current $I_{REF}$:

$$I_{Mn}=I_{REF} \quad (14)$$

In this regard, output current $I_{Mn}$ mirrors reference current $I_{REF}$, and also is referred to herein as mirror current $I_{Mn}$.

Following similar terminology described above regarding current mirror circuit 400a of FIG. 4A, first transistor $M_{1a}$, second transistor $M_{2a}$, third transistor $M_{3a}$, and fourth transistor $M_{4a}$ of current mirror circuit 500a of FIG. 5A are also referred to herein as "first driver device $M_{1a}$," "first mirror device $M_{2a}$," second driver device $M_{3a}$," and "second mirror device $M_{4a}$," respectively.

By rationing the dimensions of first mirror device $M_{2a}$ and second mirror device $M_{4a}$ relative to the dimensions of first driver device $M_{1a}$ and second driver device $M_{3a}$, respectively, output current $I_{Mn}$ may be made proportional to reference current $I_{REF}$.

For example, if first driver device $M_{1a}$ has a width $W_1$ and a length L, first mirror device $M_{2a}$ has a width $W_2$ and a length L, second driver device $M_{3a}$ has a width $W_3$ and a length L, and second mirror device $M_{4a}$ has a width $W_4$ and a length L, and if $W_2/W_1=W_4/W_3$, output current $I_{Mn}$ may be expressed as follows:

$$I_{Mn}=\left(\frac{W_2}{W_1}\right)I_{REF} \quad (15)$$

For example, if $W_2=W_1$, $I_{Mn}=I_{REF}$. Alternatively, if $W_2=2W_1$, $I_{Mn}=2\times I_{REF}$, and so on.

To replicate mirrored currents $I_{Mn}$ to multiple circuits on an integrated circuit die, bus $B_a$ and quiet ground bus $GB_Q$ may be routed throughout the die to multiple instances of first mirror device $M_{2a}$ and second mirror device $M_{4a}$, scaled as desired to provide mirror currents proportional to current $I_{REF}$. Because substantially no current flows through bus $B_a$, the voltage on bus $B_a$ remains substantially constant at $V_{g1a}$ throughout the die. In this regard, first driver device $M_{1a}$ provides a first bias voltage $V_{g1a}$ on bus $B_a$. Likewise, because substantially no current flows through quiet ground bus $GB_Q$, the voltage on quiet ground bus $GB_Q$ remains substantially constant at $V_{g3a}$ throughout the die. In this regard, second driver device $M_{3a}$ provides a second bias voltage $V_{g3a}$ different from first bias voltage $V_{g1a}$ on quiet ground bus $GB_Q$.

As a result, without wanting to be bound by any particular theory, it is believed that despite variations in the voltage at drain $d_{4a}$ across all instances of second mirror device $M_{4a}$ throughout the die as a result of resistance $R_g$ in ground bus GB, the gate-to-source voltage across all instances of first mirror device $M_{2a}$ will be substantially the same throughout the die (for 1:1 ratioed mirror devices), and thus all mirrored currents $I_{Mn}$ will be substantially the same throughout the die (for 1:1 ratioed mirror devices) independent of voltage differences along the power supply bus between first driver device $M_{1a}$ and first mirror device $M_{2a}$.

In addition, without wanting to be bound by any particular theory, it is believed that despite variations in the voltage at drain $d_{4a}$ across all instances of second mirror device $M_{4a}$ throughout the die as a result of resistance $R_g$ in ground bus GB, the gate-to-source voltage across all instances of first mirror device $M_{2a}$ will be substantially the same throughout the die (for 1:1 ratioed mirror devices), and thus all mirrored currents $I_{Mn}$ will be substantially the same throughout the die (for 1:1 ratioed mirror devices) independent of distance between first driver device $M_{1a}$ and first mirror device $M_{2a}$.

Although the example current mirror circuit 500*a* of FIG. 5A is configured with drain $d_{3a}$ of second driver device $M_{3a}$ and drain $d_{4a}$ of second mirror device $M_{4a}$ coupled to ground bus GB, the same principle applies if ground bus GB were alternatively a negative power supply bus coupled to a negative power supply (e.g., $V_{SS}$=−1.7V).

Figure 5B:
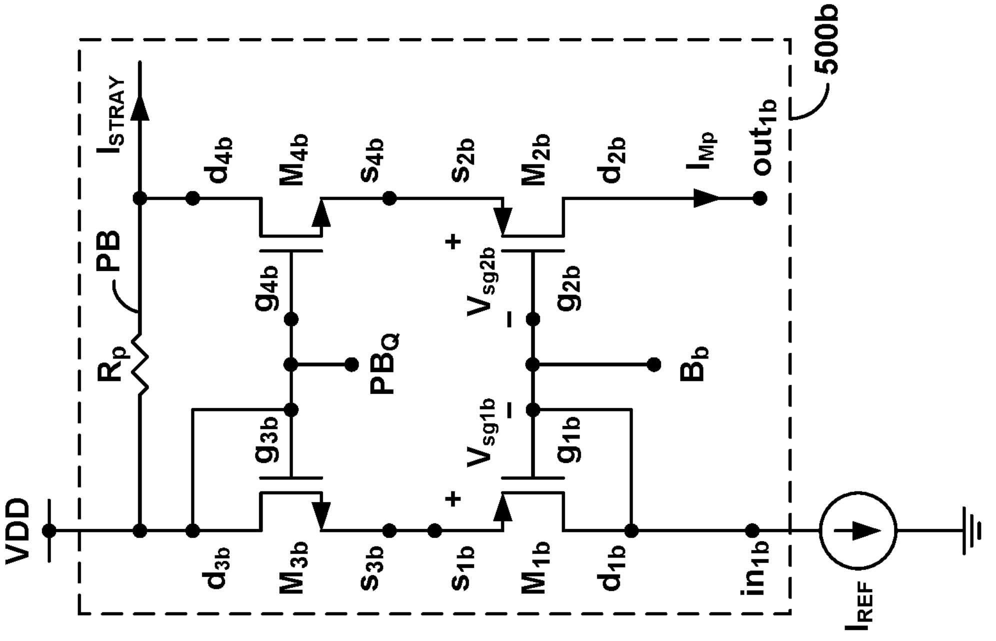
FIG. 5B is a diagram of another embodiment of a current mirror circuit.

FIG. 5B is another embodiment of a current mirror circuit that may reduce the impact of power supply bus resistance on current mirror output currents. In particular, current mirror circuit 500*b* has an input terminal $in_{1b}$, an output terminal $out_{1b}$, a first transistor $M_{1b}$, a second transistor $M_{2b}$, a third transistor $M_{3b}$ and a fourth transistor $M_{4b}$. In the depicted example, first transistor $M_{1b}$ and second transistor $M_{2b}$ are each of a first conductivity type (e.g., p-channel transistors), and third transistor $M_{3b}$ and fourth transistor $M_{4b}$ are each of a second conductivity type different from the first conductivity type (e.g., n-channel transistors).

First transistor $M_{1b}$ has a first (e.g., drain) terminal $d_{1b}$, a second (e.g., source) terminal $s_{1b}$ and a third (e.g., control or gate) terminal $g_{1b}$. Second transistor $M_{2b}$ has a first (e.g., drain) terminal $d_{2b}$, a second (e.g., source) terminal $s_{2b}$ and a third (e.g., control or gate) terminal $g_{2b}$. Third transistor $M_{3b}$ has a first (e.g., drain) terminal $d_{3b}$, a second (e.g., source) terminal $s_{3b}$ and a third (e.g., control or gate) terminal $g_{3b}$. Fourth transistor $M_{4b}$ has a first (e.g., drain) terminal $d_{4b}$, a second (e.g., source) terminal $s_{4b}$ and a third (e.g., control or gate) terminal $g_b$.

For convenience, first terminal $d_{1b}$, second terminal $s_{1b}$ and third terminal $g_{1b}$ of first transistor $M_{1b}$ also will be referred to herein as drain $d_{1b}$, source $s_{1b}$ and gate $g_{1b}$, respectively, of first transistor $M_{1b}$. Likewise, first terminal $d_{2b}$, second terminal $s_{2b}$ and third terminal $g_{2b}$ of second transistor $M_{2b}$ also will be referred to herein as drain $d_{2b}$, source $s_{2b}$ and gate $g_{2b}$, respectively, of second transistor $M_{2b}$. Similarly, first terminal $d_{3b}$, second terminal $s_{3b}$ and third terminal gab of third transistor $M_{3b}$ also will be referred to herein as drain $d_{3b}$, source $s_{3b}$ and gate $g_{3b}$, respectively, of third transistor M3b. Additionally, first terminal $d_{4b}$, second terminal $s_{4b}$ and third terminal gab of fourth transistor $M_{4b}$ also will be referred to herein as drain $d_4$, source $s_4$ and gate $g_4$, respectively, of fourth transistor $M_4$.

Drain $d_{1b}$ of first transistor $M_{1b}$ is coupled to input terminal $in_{1b}$, gate $g_{1b}$ of first transistor $M_{1b}$, and gate $g_{2b}$ of second transistor $M_{2b}$. Drain $d_{2b}$ of second transistor $M_{2b}$ is coupled to output terminal $out_{1b}$. First transistor $M_{1b}$, configured as shown in FIG. 5B with drain $d_{1b}$ and gate $g_{1b}$ coupled together, is commonly referred to as a diode-connected transistor.

Drain $d_{3b}$ of third transistor $M_{3b}$ is coupled to second power supply bus (e.g., positive power bus PB), gate $g_{4b}$ of third transistor $M_{3b}$, and gate $g_{4b}$ of fourth transistor $M_{4b}$. Drain $d_{4b}$ of fourth transistor $M_{4b}$ is coupled to positive power bus PB, which is coupled to second power supply VDD. Third transistor $M_{3b}$, configured as shown in FIG. 5B with drain $d_{3b}$ and gate $g_{3b}$ coupled together, is commonly referred to as a diode-connected transistor. Resistance in power bus PB is represented as $R_P$. In an embodiment, drain $d_{3b}$ of third transistor $M_{3b}$ is coupled to a first location of positive power bus PB, and drain $d_{4b}$ of fourth transistor $M_{4b}$ is coupled to second location different from the first location of positive power bus PB.

Source $s_{1b}$ of first transistor $M_{1b}$ is coupled to source $s_{3b}$ of third transistor $M_{3b}$, and source $s_{2b}$ of second transistor $M_{2b}$ is coupled to source $s_{4b}$ of fourth transistor $M_{4b}$. Input terminal $in_{1b}$ receives input reference current $I_{REF}$, depicted here as an ideal current source coupled to first power supply GND.

In operation, reference current $I_{REF}$ flows through diode-connected first transistor $M_{1b}$ and diode-connected third transistor $M_{3b}$. Drain $d_{3b}$ and gate $g_{4b}$ of third transistor $M_{3b}$ are at the same voltage $V_{g3b}$. In the embodiment of FIG. 5B, drain $d_{3b}$ and gate $g_{4b}$ of third transistor $M_{3b}$ are coupled to positive power bus PB, and thus voltage $V_{g3b}$ is at VDD (e.g., $V_{g3b}$=1.7V).

The conductor coupling gate $g_{3b}$ of third transistor $M_{3b}$ to gate $g_{4b}$ of fourth transistor $M_{4b}$ is labeled $PB_Q$ in FIG. 5B. Conductor $PB_Q$ is also referred to herein as "quiet power bus" $PB_Q$. No current flows through quiet power bus $PB_Q$, and thus gate $g_{4b}$ of fourth transistor $M_{4b}$ is at a voltage $V_{g4b}$ that is substantially the same as voltage $V_{g3b}$ at gate $g_{4b}$ of third transistor $M_{3b}$. In the embodiment of FIG. 5B, voltage $V_{g4b}$ is at VDD (e.g., $V_{g4a}$=1.7V).

Source $s_{3b}$ of third transistor $M_{3b}$ is at a voltage $V_{s3b}$ which may be expressed as:

$$V_{s3b}=\text{VDD}=(V_{ON3}+V_{tn}) \quad (16)$$

where $V_{ON3}$ is an on voltage of third transistor $M_{3b}$ and $V_{tn}$ is a threshold voltage of n-channel third transistor $M_{3b}$. Source so of first transistor $M_{1b}$ is at a voltage $V_{s1b}$ and is coupled to source $s_{3b}$ of third transistor $M_{3b}$. As a result, voltage $V_{s1b}$ equals voltage $V_{s3b}$:

$$V_{s1b}=V_{s3b} \quad (17)$$

As stated above, gate $g_{3b}$ of third transistor $M_{3b}$ and gate $g_{4b}$ of fourth transistor $M_{4b}$ are at substantially the same voltage $V_{g3b}$. Because the source voltage of a MOS transistor in saturation is a very weak function of the drain voltage, source $s_{4b}$ of fourth transistor $M_{4b}$ is at a voltage $V_{s4b}$ that is substantially the same as voltage $V_{s3b}$ at source $s_{3b}$ of third transistor $M_{3b}$:

$$V_{s4b}\approx V_{s3b} \quad (18)$$

Without wanting to be bound by any particular theory, it is believed that even a voltage difference of several hundred millivolts between drain $d_{4b}$ of fourth transistor $M_{4b}$ and drain $d_{3b}$ of third transistor $M_{3b}$ due to a voltage drop across positive power bus PB resistance $R_P$ results in very little difference in source voltages $V_{s3b}$ and $V_{s4b}$, primarily due to third transistor $M_{3b}$ and fourth transistor $M_{4b}$ operating in the saturation region.

Source $s_{2b}$ of second transistor $M_{2b}$ is at a voltage $V_{s2b}$ and is coupled to source $s_{4b}$ of fourth transistor $M_{4b}$. As a result, voltage $V_{s2b}$ at source $s_{2b}$ of second transistor $M_{2b}$ equals voltage $V_{s4b}$ at source $s_{4b}$ of fourth transistor $M_{4b}$:

$$V_{s2b}=V_{s4b} \quad (19)$$

Thus, from Equations (17)-(19), source $s_{2b}$ of second transistor $M_{2b}$ and source so of first transistor $M_{1b}$ are at substantially the same voltage:

$$V_{s2b} \leq V_{s1b} \tag{20}$$

In an embodiment, the absolute value of a difference between $V_{s2b}$ and $V_{s1b}$ is less than about 5% despite voltage drops in positive power bus PB between drain $d_{3b}$ of third transistor $M_{3b}$ and drain $d_{4b}$ of fourth transistor $M_{4b}$. In another embodiment, the absolute value of a difference between $V_{s2b}$ and $V_{s1b}$ is less than about 2% despite voltage drops in positive power bus PB between drain $d_{3b}$ of third transistor $M_{3b}$ and drain $d_{4b}$ of fourth transistor $M_{4b}$. In still another embodiment, the absolute value of a difference between $V_{s2b}$ and $V_{s1b}$ is less than about 1% despite voltage drops in positive power bus PB between drain $d_{3b}$ of third transistor $M_{3b}$ and drain $d_{4b}$ of fourth transistor $M_{4b}$.

Gate $g_{1b}$ of first transistor is at a voltage $V_{g1b}$, which may be expressed as:

$$V_{g1b} = V_{s1b} - (V_{ON1} + |V_{tp}|) \tag{21}$$

where $V_{ON1}$ is an on voltage of first transistor $M_{1b}$ and $V_{tp}$ is a threshold voltage of p-channel first transistor $M_{1b}$. Substituting Equation (16) into Equation (21), voltage $V_{g1b}$ may be expressed as:

$$V_{g1b} = VDD - (V_{ON3} + V_{tn} + V_{ON1}|V_{tp}|) \tag{22}$$

The conductor coupling gate $g_{1b}$ of first transistor $M_{1b}$ to gate $g_{2b}$ of second transistor $M_{2b}$ is labeled $B_b$ in FIG. 5B. No current flows through conductor $B_b$, and thus gate $g_{2b}$ of second transistor $M_{2b}$ also is at voltage $V_{g1b}$. As a result, source-to-gate voltage $V_{sg1b}$ of first transistor $M_{1b}$ substantially equals source-to-gate voltage $V_{sg2b}$ of second transistor $M_{2b}$:

$$V_{sg1b} = V_{sg2b} \tag{23}$$

If first transistor $M_{1b}$ and second transistor $M_{2b}$ are of equal size, second transistor $M_{2b}$ conducts an output current $I_{Mp}$ that substantially equals reference current $I_{REF}$:

$$I_{Mp} = I_{REF} \tag{24}$$

In this regard, output current $I_{Mp}$ mirrors reference current $I_{REF}$, and also is referred to herein as mirror current $I_{Mp}$.

Following similar terminology described above regarding current mirror circuit 400*a* of FIG. 4A, first transistor $M_{1b}$, second transistor $M_{2b}$, third transistor $M_{3b}$, and fourth transistor $M_{4b}$ of current mirror circuit 500*b* of FIG. 5B are also referred to herein as "first driver device $M_{1b}$," "first mirror device $M_{2b}$," second driver device $M_{3b}$," and "second mirror device $M_{4b}$," respectively.

By rationing the dimensions of first mirror device $M_{2b}$ and second mirror device $M_{4b}$ relative to the dimensions of first driver device $M_{1b}$ and second driver device $M_{3b}$, respectively, output current $I_{Mp}$ may be made proportional to reference current $I_{REF}$.

For example, if first driver device $M_{1b}$ has a width $W_1$ and a length L, first mirror device $M_{2b}$ has a width $W_2$ and a length L, second driver device $M_{3b}$ has a width $W_3$ and a length L, and second mirror device $M_{4b}$ has a width $W_4$ and a length L, and if $W_2/W_1 = W_4/W_3$, output current $I_{Mp}$ may be expressed as follows:

$$I_{Mp} = \left(\frac{W_2}{W_1}\right) I_{REF} \tag{25}$$

For example, if $W_2 = W_1$, $I_{Mp} = I_{REF}$, if $W_2 = 2W_1$. Alternatively, if $I_{Mp} = 2 \times I_{REF}$, and so on.

To replicate mirrored currents $I_{Mp}$ to multiple circuits on an integrated circuit die, bus $B_b$ and quiet power bus $PB_Q$ may be routed throughout the die to multiple instances of first mirror device $M_{2b}$ and second mirror device $M_{4b}$, scaled as desired to provide mirror currents proportional to reference current $I_{REF}$. Because substantially no current flows through bus $B_b$, the voltage on bus $B_b$ remains substantially constant at $V_{g1b}$ throughout the die. In this regard, first driver device $M_{1b}$ provides a first bias voltage $V_{g1b}$ on bus $B_b$. Likewise, because substantially no current flows through quiet power bus $PB_Q$, the voltage on quiet power bus $PB_Q$ remains substantially constant at $V_{g3b}$ throughout the die. In this regard, second driver device $M_{3b}$ provides a second bias voltage $V_{g3b}$ different from first bias voltage $V_{g1b}$ on quiet power bus $PB_Q$.

As a result, without wanting to be bound by any particular theory, it is believed that despite variations in the voltages at drain $d_{4b}$ across all instances of second mirror device $M_{4b}$ throughout the die as a result of resistance $R_P$ in positive power bus PB, the source-to-gate voltage across all instances of first mirror device $M_{2b}$ will be substantially the same throughout the die (for 1:1 ratioed mirror devices), and thus all mirrored currents $I_{Mp}$ will be substantially the same throughout the die (for 1:1 ratioed mirror devices) independent of voltage differences along the power supply bus between first driver device $M_{1b}$ and first mirror device $M_{2b}$.

In addition, without wanting to be bound by any particular theory, it is believed that despite variations in the voltages at drain $d_{4b}$ across all instances of second mirror device $M_{4b}$ throughout the die as a result of resistance $R_P$ in positive power bus PB, the source-to-gate voltage across all instances of first mirror device $M_{2b}$ will be substantially the same throughout the die (for 1:1 ratioed mirror devices), and thus all mirrored currents $I_{Mp}$ will be substantially the same throughout the die (for 1:1 ratioed mirror devices) independent of distance between first driver device $M_{1b}$ and first mirror device $M_{2b}$.

Figure 6:
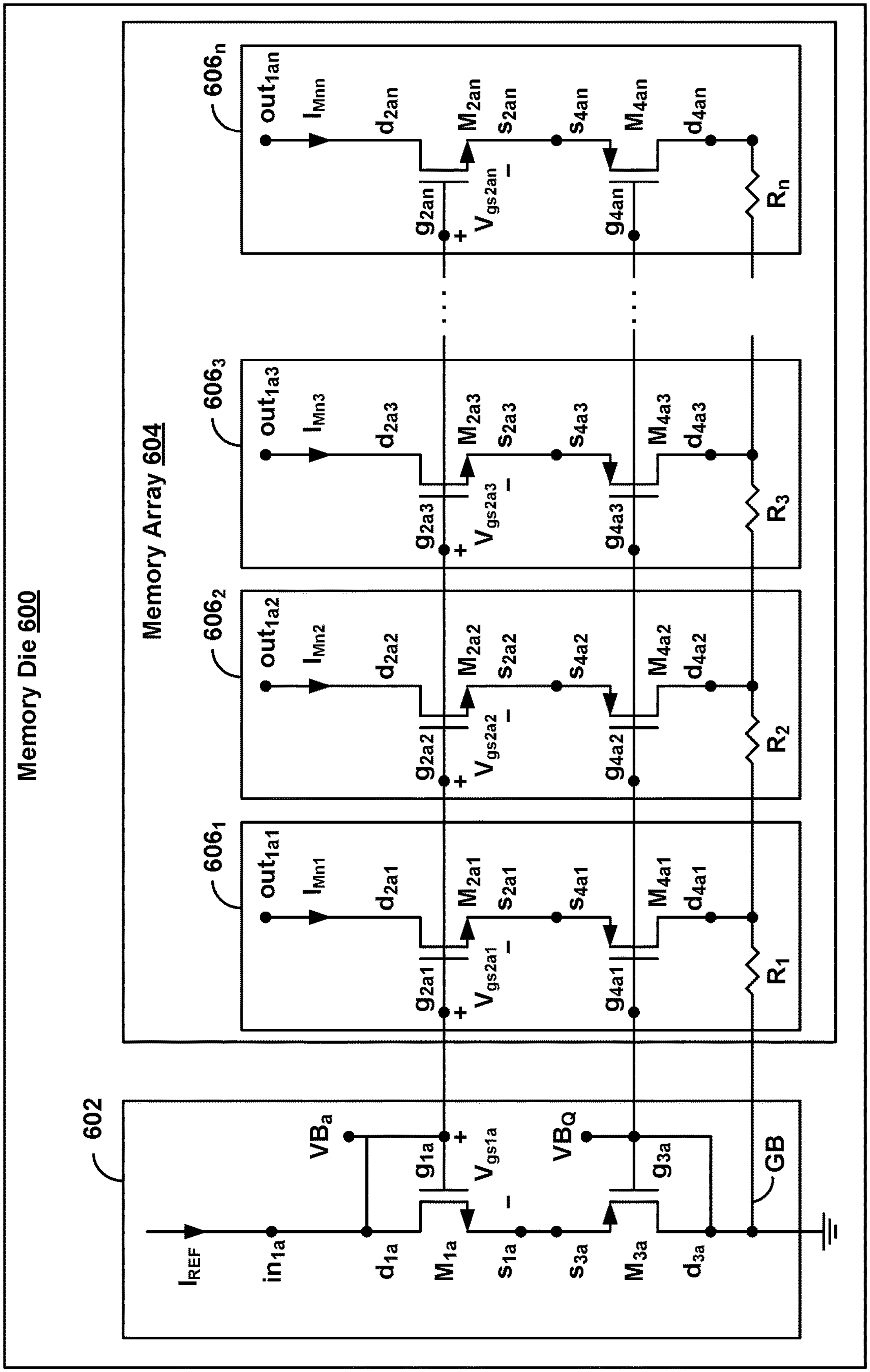
FIG. 6 is a diagram of an embodiment of a memory die.

FIG. 6 is a diagram of an embodiment of a memory die 600. Each of the one or more memory die 106 of FIG. 1 can be implemented as memory die 600 of FIG. 6. Memory die 600 includes a current mirror driver circuit 602 and a memory array 604. Current mirror driver circuit 602 is coupled to a power supply bus (e.g., ground bus GB) and includes a first driver device $M_{1a}$ configured to provide a first bias voltage $VB_a$, and a second driver device $M_{3a}$ configured to provide a second bias voltage $VB_Q$ different from first bias voltage $VB_a$. First driver device $M_{1a}$ and second driver device $M_{3a}$ conduct a first current $I_{REF}$.

In an embodiment, memory array 604 includes multiple sub-arrays 606$_1$, 606$_2$, 606$_3$, . . . , 606$_n$, each of sub arrays 606$_1$, 606$_2$, 606$_3$, . . . , 606$_n$ include a corresponding first mirror device $M_{2a1}$, $M_{2a2}$, $M_{2a3}$, . . . , $M_{2an}$, respectively, coupled to the first bias voltage, and a corresponding second mirror device $M_{4a1}$, $M_{4a2}$, $M_{4a3}$, . . . , $M_{4an}$, respectively, coupled to the second bias voltage and to ground bus GB.

In an embodiment, each first mirror device $M_{2a1}$, $M_{2a2}$, $M_{2a3}$, . . . , $M_{2an}$ and second mirror device $M_{4a1}$, $M_{4a2}$, $M_{4a3}$, . . . , $M_{4an}$ conducts a corresponding second current $I_{Mn1}$, $I_{Mn2}$, $I_{Mn3}$, . . . , $I_{Mnn}$, respectively. In an embodiment, corresponding second currents $I_{Mn2}$, $I_{Mn3}$, . . . , $I_{Mnn}$ of sub-arrays 606$_1$, 606$_2$, 606$_3$, . . . , 606$_n$, respectively, are substantially equal.

One embodiment includes a circuit that includes a first transistor having a first terminal, a second terminal and a third terminal, and a second transistor comprising a first terminal, a second terminal and a third terminal. The first terminal of the first transistor comprises an input terminal of the circuit, the second terminal of the first transistor is coupled to a power supply bus, and the first transistor conducts a first current. The first terminal of the first transistor comprises an output terminal of the circuit, the second terminal of the second transistor is coupled to the power supply bus, and the third terminal of the second transistor is coupled to the third terminal of the first transistor. The second transistor conducts a second current proportional to the first current substantially independent of distance between the first transistor and the second transistor.

One embodiment includes a current mirror circuit that includes a diode-connected first transistor of a first conductivity type, a second transistor of the first conductivity type, a diode-connected third transistor of a second conductivity type different from the first conductivity, and a fourth transistor of the second conductivity type. The diode-connected first transistor is coupled to the second transistor, a control terminal of the first transistor is coupled to a control terminal of the second transistor. The diode-connected third transistor is coupled to the first diode-connected transistor and to the fourth transistor, the fourth transistor is coupled to the second transistor, and a control terminal of the third transistor is coupled to a control terminal of the second transistor. The first transistor and the third transistor each conduct a first current and the second transistor and the fourth transistor each conduct a second current that is substantially proportional to the first current.

One embodiment includes an apparatus including a memory die comprising a current mirror driver circuit and a memory array. The current mirror driver circuit is coupled to a power supply bus and includes a first driver device configured to provide a first bias voltage, and a second driver device configured to provide a second bias voltage different from the first bias voltage. The first driver device and the second driver device conduct a first current. The memory array includes a plurality of sub-arrays, each sub array including a corresponding first mirror device coupled to the first bias voltage, and a corresponding second mirror device coupled to the second bias voltage and to the power supply bus. The first mirror device and second mirror device conduct a corresponding second current. The corresponding second currents of each of the plurality of sub-arrays are substantially equal.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

The invention claimed is:

1. A circuit comprising:

a first transistor comprising a first terminal, a second terminal and a third terminal, the first terminal of the first transistor comprising an input terminal of the circuit, the second terminal of the first transistor coupled to a power supply bus, the first transistor conducting a first current; and a second transistor comprising a first terminal, a second terminal and a third terminal, the first terminal of the second transistor comprising an output terminal of the circuit, the second terminal of the second transistor coupled to the power supply bus, the third terminal of the second transistor coupled to the third terminal of the first transistor, wherein the second transistor conducts a second current proportional to the first current substantially independent of resistance in the power supply bus between the first transistor and the second transistor.

2. The circuit of claim 1, wherein the first terminal of the first transistor is coupled to the third terminal of the first transistor.

3. The circuit of claim 1, wherein the second current substantially equals the first current.

4. The circuit of claim 1, wherein a voltage at the second terminal of the second transistor substantially equals a voltage at the second terminal of the first transistor independent of distance between the first transistor and the second transistor.

5. The circuit of claim 1, wherein:

the second terminal of the first transistor is coupled to a first location on the power supply bus; and the second terminal of the second transistor is coupled to a second location different from the first location on the power supply bus.

6. The circuit of claim 5, wherein a first voltage at the first location of the power supply bus differs from a second voltage at the second location of the power supply bus.

7. The circuit of claim 1, further comprising:

a third transistor comprising a first terminal, a second terminal and a third terminal, the first terminal of the third transistor coupled to the power supply bus, the second terminal of the third transistor coupled to the second terminal of the first transistor conducting the first current; and a fourth transistor comprising a first terminal, a second terminal and a third terminal, the first terminal of the fourth transistor coupled to the power supply bus, the second terminal of the fourth transistor coupled to the second terminal of the second transistor, the third terminal of the third transistor coupled to the third terminal of the fourth transistor.

8. The circuit of claim 7, wherein the first terminal of the third transistor is coupled to the third terminal of the third transistor.

9. The circuit of claim 7, wherein the first transistor and the second transistor comprise a first conductivity type and the third transistor and the fourth transistor comprise a second conductivity type different from the first conductivity type.

10. The circuit of claim 1, wherein the power supply bus comprises any of a ground bus, a positive power supply bus, or a negative power supply bus.

11. The circuit of claim 1 comprising a current mirror circuit.

12. A current mirror circuit comprising:

a diode-connected first transistor of a first conductivity type coupled to a second transistor of the first conductivity type, a control terminal of the first transistor coupled to a control terminal of the second transistor; and a diode-connected third transistor of a second conductivity type different from the first conductivity type coupled to the first diode-connected transistor and to a fourth transistor of the second conductivity type, the fourth transistor coupled to the second transistor, a control terminal of the third transistor coupled to a control terminal of the fourth transistor, wherein the first transistor and the third transistor each conduct a first current and the second transistor and the fourth transistor each conduct a second current substantially proportional to the first current.

13. The current mirror circuit of claim 12, wherein the second current is substantially proportional to the first current independent of distance between the first transistor and the second transistor and between the third transistor and the fourth transistor.

14. The current mirror circuit of claim 12, wherein the second current substantially equals the first current.

15. The current mirror circuit of claim 12, wherein the third transistor and the fourth transistor are each coupled to a power supply bus that comprises a voltage difference along a length of the power supply bus between the third transistor and the fourth transistor.

16. The current mirror circuit of claim 15, wherein the power supply bus comprises any of a ground bus, a positive power supply bus, or a negative power supply bus.

17. An apparatus comprising:

a memory die comprising:

a current mirror driver circuit coupled to a power supply bus and comprising a first driver device configured to provide a first bias voltage, and a second driver device configured to provide a second bias voltage different from the first bias voltage, the first driver device and the second driver device conducting a first current; and a memory array comprising a plurality of sub-arrays, each sub array comprising a corresponding first mirror device coupled to the first bias voltage, and a corresponding second mirror device coupled to the second bias voltage and to the power supply bus, the first mirror device and second mirror device conducting a corresponding second current, wherein the corresponding second currents of each of the plurality of sub-arrays are substantially equal independent of resistance in the power supply bus.

18. The apparatus of claim 17, wherein corresponding second currents each are substantially proportional to the first current.

19. The apparatus of claim 17, wherein the first driver device comprises a first conductivity type, and the second driver device comprises a second conductivity type different from the first conductivity type.

20. The apparatus of claim 17, wherein the power supply bus comprises any of a ground bus, a positive power supply bus, or a negative power supply bus.

* * * * *